Inventors:
August L. Streater,
Walter R. Wilson,
by J. Wesley Naubrer
Their Attorney.

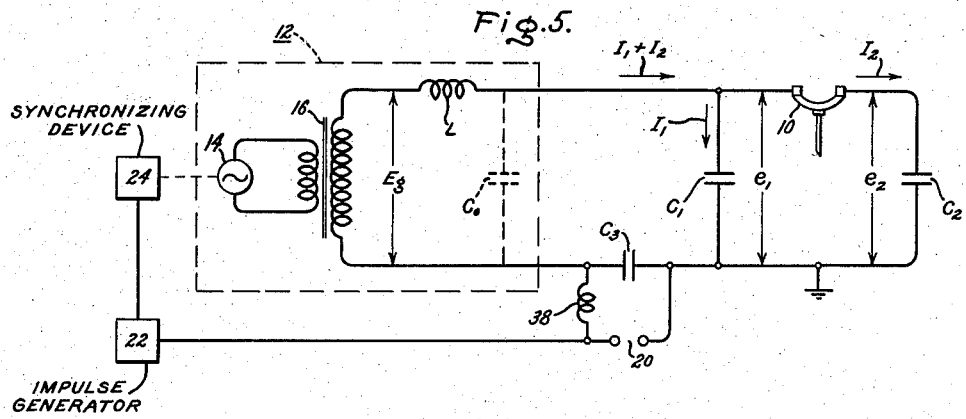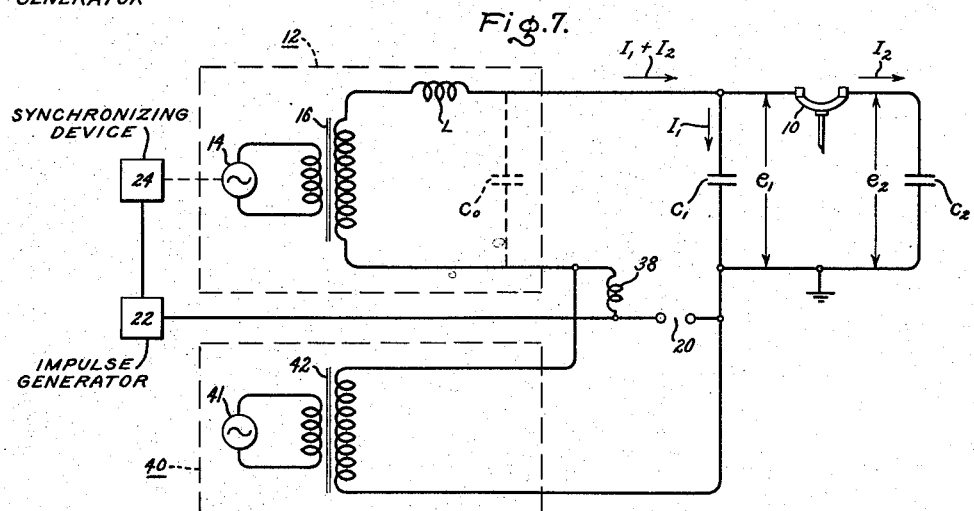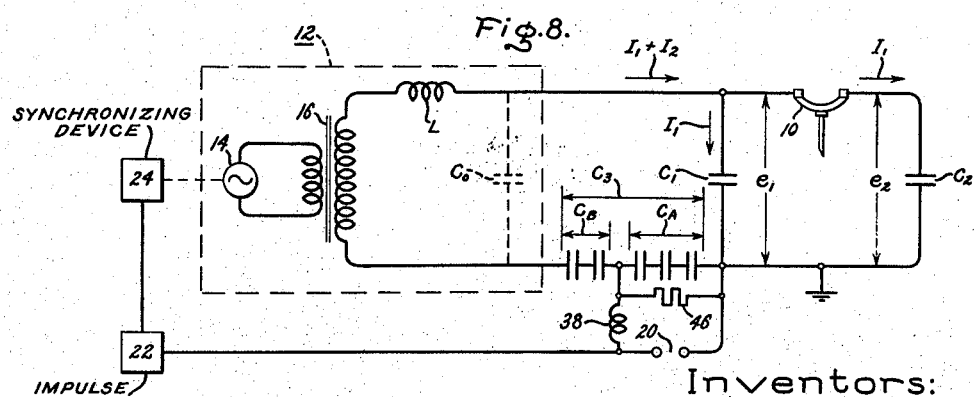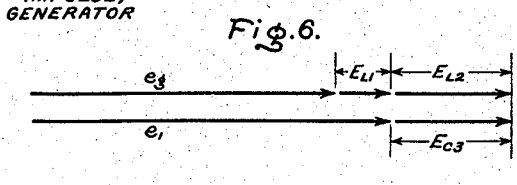

United States Patent Office 2,914,724
Patented Nov. 24, 1959

2,914,724
CIRCUIT AND METHOD FOR TESTING HIGH CAPACITY POWER CIRCUIT BREAKERS

August L. Streater and Walter R. Wilson, Broomall, Pa., assignors to General Electric Company, a corporation of New York Application April 25, 1957, Serial No. 655,142

13 Claims. (Cl. 324—28)

This invention relates to a test circuit and a method for evaluating the capacitance-switching ability of a high voltage circuit breaker. More particularly, it relates to a circuit and a method which can be used in a laboratory for testing the ability of a circuit breaker under actual field conditions to isolate a predominately capacitive load.

As is well known, the isolation of a capacitance load by a circuit breaker in an alternating current system can produce transient overvoltages of seriously large magnitude. In isolating such a capacitance load under actual field conditions, interruption at the first current zero is readily effected at a relatively small contact separation. This is the case because the load remains at approximately the crest value of the instantaneous voltage of the source for several hundred microseconds during which there is little or no voltage across the circuit breaker interrupting contacts. But, in one half cycle after the first current zero, the voltage of the source has reversed to its crest value, and approximately double the crest value appears across the circuit breaker contacts as a circuit recovery voltage. It is under such conditions and during this particular interval that an arc is most likely to restrike across the partially separated contacts. Such restrikes, being of an oscillatory nature, can produce seriously high overvoltages in the system.

If the gap between the contacts, instead of interrupting at the first current zero, broke down, then there would be less likelihood of an objectionable restrike occurring at a succeeding half cycle. This is the case because upon succeeding half cycles the breaker contacts have parted a relatively great distance, and accordingly, the gap then is much more capable of permanently withstanding the recovery voltage.

The ability of the breaker to interrupt the circuit at the first current zero depends upon the extent to which opening of the breaker affects the voltage on the generator terminal side of the breaker. For example, if there is little effect on this terminal voltage, then interruption at the first current zero is comparatively easy. But if there is a material effect on this terminal voltage then more voltage is present across the breaker contacts, and interruption at this instant is more difficult. For power circuits of very high power capacity, opening of the breaker has very little effect on the generator terminal voltage of the breaker, and accordingly it is comparatively easy for the breaker to interrupt such circuits at the first current zero. This, of course, renders the breaker more susceptible to restrikes at succeeding half cycles. For power circuits of lower capacity, opening of the breaker produces a sudden drop in the voltage on the generator terminal side of the breaker at the first current zero. This sudden drop produces a voltage across the contacts which is likely to cause reignition at the first current zero. Thus, in such circuits it is easier for the breaker to effect permanent interruption at a succeeding current zero, thus reducing the likelihood of restrikes.

The above-described change in voltage which occurs at the generator terminal side of the breaker at the first current zero is referred to hereinafter as the regulation of the system. Where this voltage change is small, the system regulation can be thought of as being small, and where this change is comparatively large, the system regulation can be thought of as being large. Because of the above considerations, it has been difficult to accurately simulate actual field conditions in a testing laboratory where the available power capacity is much lower than would be present in the field. The high voltage-regulation which is present in such laboratory testing circuits has caused breakdown at the first current zero and thus reduced the likelihood of restrikes, thus rendering the laboratory tests considerably less severe than field conditions.

A general object of our invention is to provide a relatively low power capacity test circuit which is capable of accurately simulating the actual field conditions to which the breaker is subjected when switching capacitance loads in a high power capacity circuit.

Another object is to provide a method of utilizing a relatively low power capacity source for accurately simulating the actual field conditions to which a breaker will be subjected when switching capacitance loads in a high power capacity circuit.

Another object is to provide a test circuit of relatively low power capacity in which the voltage regulation simulates that encountered in actual field conditions when switching capacitance loads.

Another object is to modify the usual capacitor switching test circuit in such a manner as to materially lower its voltage regulation immediately folowing interruption at a current zero.

In carrying out our invention in one form, we provide a test circuit in which the circuit breaker being tested is connected between a source of alternating voltage and a capacitor having a capacitance representative of the capacitance which is to be switched in the field. The circuit breaker is connected in series with the capacitor and carries load current between the source and the capacitor. In series with the source, the breaker, and the capacitor, we connect compensating means which acts while the breaker is closed to provide a voltage which is generally equal and vectorially opposite to the voltage component produced by load current flowing through the inductance of the source. On a steady-state basis, this compensating means reduces the effective source impedance to a value such as would be present under typical field conditions. Upon opening of the breaker and at about the instant of current zero across the breaker contacts, the compensating means is effectively shorted out. This action causes the voltage at the source terminal side of the breaker to be essentially unchanged by opening of the breaker, thus producing voltage conditions which closely simulate those which would be present in the field.

For a better understanding of our invention, reference may be had to the following specification taken in connection with the accompanying drawing, wherein:

Fig. 5 illustrates another form of test circuit embodying our invention.

Fig. 6 is a vector diagram illustrating certain electrical relationships which are present in the circuit of Fig. 5.

Fig. 7 shows another modified form of test circuit embodying our invention.

Fig. 8 shows still another modified form of test circuit embodying our invention.

Figure 1:
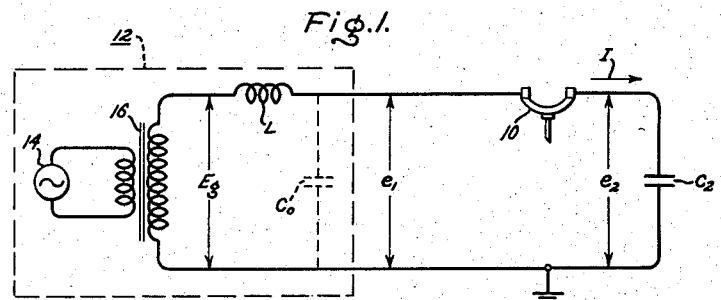
Fig. 1 is a conventional prior art scheme for testing the capacitance-switching ability of a power circuit breaker.

To facilitate an understanding of the problem to which our invention is directed, a conventional laboratory test circuit has been shown in Fig. 1. The purpose of this circuit of Fig. 1 is to provide a laboratory test of the ability of a circuit breaker 10, under actual field conditions, to isolate a capacitive load from a high power-capacity source of alternating voltage. The capacitive load is simulated by a capacitor $C_2$ which has a capacitance generally equal to that of the capacitive load which is to be switched under actual field conditions. The source of alternating voltage is simulated by a laboratory source generally indicated at 12, and the circuit breaker 10 is connected in series with the source 12 and the capacitor $C_2$.

The source 12 comprises a main alternating-power generator 14 and a suitable power transformer 16 connected across the terminals of the generator 14. The internal, or distributed, capacitance of the source 12 is illustrated in dotted lines by a capacitor $C_0$ connected across the terminals of the source and in parallel with the capacitor $C_2$. The internal inductance of the source is represented by an inductance L connected in series with the source and the capacitor $C_2$. This inductance L is occasionally referred to hereinafter as the regulation reactance and has an inductive reactance $X_L$ at normal source frequency.

For economics reasons, it is necessary in the laboratory to rely upon a power source which has a considerably lower power capacity than might be available under actual field conditions. A result of using a source of lower power capacity is that the internal impedance of such source is considerably higher than is the case with the higher capacity sources used under actual field conditions. Hence, in the test circuit of Fig. 1 the regulation reactance L of the laboratory source 12 is considerably larger than the regulation reactance which typically will be present in the field. The significance of this difference will soon be described in detail. The steady-state terminal voltage of the source 12 is preferably so adjusted that it is equal to the corresponding terminal voltage which will be present in the field.

Figure 2:
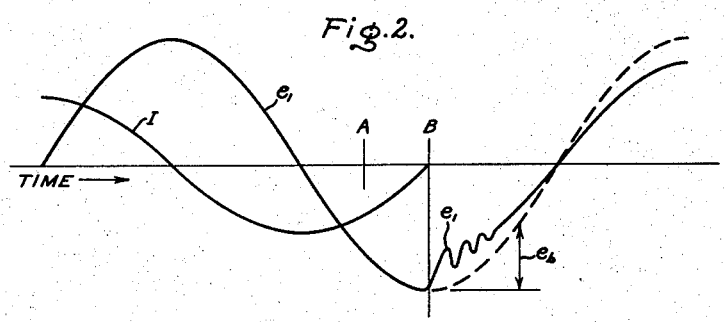
Fig. 2 is a graphical representation of certain electrical relationships which are present in the circuit of Fig. 1.

Assume first that the circuit breaker 10 is in closed position and that alternating power is flowing between the source 12 and the capacitance $C_2$. The current I flowing through the circuit breaker contacts will lead the terminal volage $e_1$ of the source by 90 degrees inasmuch as the load $C_2$ is substantially entirely capacitive. This phase relationship is depicted in Fig. 2. If the breaker is tripped toward open position and its contacts part at an instant A in Fig. 2, arcing will take place until a first current zero is reached at an instant B (when the voltage $e_1$ is at its crest value). At this instant B, the voltage level $e_2$ at the capacitor $C_2$ side of the breaker 10 is equal to the voltage level $e_1$ at the source side of the breaker. Hence, there is then essentially no voltage across the breaker contacts. Thereafter, the source voltage $e_1$ begins reversing, but the capacitor voltage $e_2$ remains at approximately the crest value due to the energy-storage properties of the capacitor $C_2$. This results in a voltage $e_b$ being established across the breaker contacts.

Whether or not this voltage $e_b$ immediately causes a breakdown to occur across the breaker contacts depends to a large extent upon the wave form which the source voltage $e_1$ follows during its reversal. Under actual field conditions, the source voltage, in reversing, will follow the dotted line curve of Fig. 2; but in the laboratory circuit of Fig. 1, the source voltage in reversing will follow the solid line transient curve $e_1$ (for reasons which will soon appear more clearly).

Assuming that the source voltage follows the dotted line curve, then it will be apparent that the voltage $e_b$ across the contacts of the breaker would build up at a relatively gradual rate, and it would therefore be comparatively easy for the breaker to effect interruption at this first current zero. This interruption, however, might be only temporary, because as the source voltage continues reversing toward its opposite crest value, the voltage $e_b$ across the breaker contacts approaches double this crest value. It is under such conditions and during this interval, that an arc is likely to restrike across the partially-separated contacts. Such restrikes, being of an oscillatory nature, can produce seriously high voltages which will be objectionable under actual field conditions. It is therefore important that the laboratory test subject the breaker to voltage conditions which are as likely to cause objectionable restrikes as those conditions encountered in the field.

If the reversing source voltage $e_1$ followed the solid line curve instead of the dotted line curve, then there would be a greater likelihood of breakdown across the breaker contacts immediately following the instant B. In this regard, the sudden drop which occurs in the voltage $e_1$ immediately following the instant B would produce a relatively sharp voltage rise across the breaker contacts, thus favoring immediate breakdown. If such breakdown occurred, essentially no voltage would be present across the breaker contacts until the next current zero, at which time the same voltage conditions would be repeated. But the breaker contacts would have been parted a relatively great distance, and, accordingly, the contact gap would then be much more capable of withstanding the recovery voltage and thereby preventing objectionable restrikes. Thus, it will be seen that when the terminal voltage $e_1$ follows the solid line transient curve of Fig. 2, there is less likelihood that objectionable restrikes will occur than when the voltage $e_1$ follows the dotted line curve, which is representative of actual field conditions. Accordingly, since the laboratory circuit of Fig. 1 causes the voltage $e_1$ to follow the solid line curve, then the laboratory test with such circuit is considerably less severe than actual field conditions.

The abrupt change in the source terminal voltage $e_1$ of the breaker which occurs immediately following current zero is referred to hereinafter as the voltage-regulation of the system. In conventional laboratory test circuits, such as shown in Fig. 1, this regulation is comparatively large because the inductive reactance $X_L$ of the source is large. For example, assuming that this inductive reactance $X_L$ is large, then immediately prior to current zero, there is a relatively large voltage ($IX_L$) across the source inductance L, but when the current I drops to zero at current-zero, this voltage disappears. The voltage $e_1$ at the source terminal side of the breaker, therefore drops suddenly as shown by solid lines in Fig. 2, approaching the new steady state curve by means of the solid-line transient which has its characteristics determined by the internal impedance of the source.

Under field conditions, however, the source inductance is comparatively small. Hence, when interruption occurs at the first current zero, the voltage change ($IX_L$) is comparatively small, with the net result being that the voltage $e_1$ substantially follows the dotted-line sine curve of Fig. 2.

Figure 3:
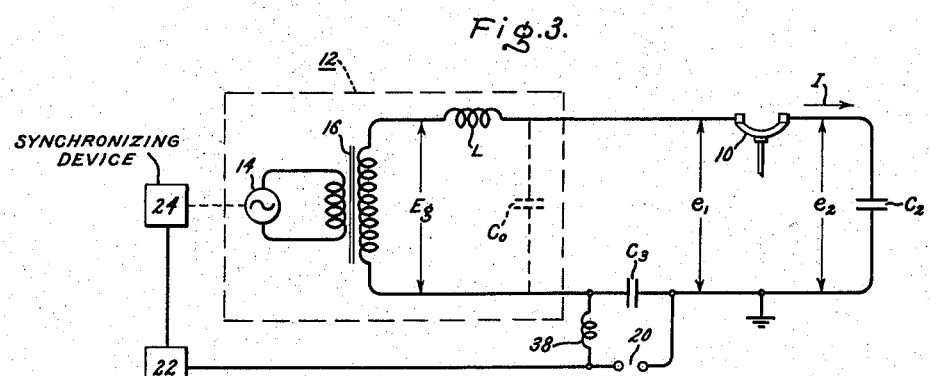
Fig. 3 illustrates one form of test circuit embodying our invention.

To provide a more accurate reproduction of actual field conditions so as to produce more severe tests than are possible with the circuit of Fig. 1, we have provided the test circuit shown in Fig. 3. This circuit of Fig. 3 utilizes the same source 12 and the same load capacitor $C_2$ as shown in Fig. 1. The circuit breaker under test is likewise connected in series with the source and the capacitor $C_2$, as in Fig. 1. It will first be assumed that the internal capacitance $C_0$ of the source is so small in comparison to the load capacitance $C_2$ as to be negligible.

In carrying out our invention in one form, we connect a compensating capacitor $C_3$ in series with the source 12, the circuit breaker 10, and the load capacitor $C_2$. This capacitor $C_3$ is selected so that, at line frequency, its capacitive reactance $X_C$ is approximately equal to the inductive reactance $X_L$ of the source. Thus, on a steady-state basis, the presence of this compensating capacitor $C_3$ substantially eliminates regulation so that the voltage across the load capacitor $C_2$ always remains equal to the open-circuit voltage $E_g$ of the source. On a transient basis, however, other considerations are present. For example, assume that the current I is interrupted by the circuit breaker 10 at a current zero and the regulation voltage ($IX_L$) across the inductance L suddenly disappears, then the voltage across the compensating capacitor $C_3$ would tend to remain temporarily at its maximum value. So long as the capacitor $C_3$ remained effectively connected in the power circuit, then the sudden voltage drop $IX_L$ would establish essentially the same objectionable transient as was present in the circuit of Fig. 1.

In accordance with our invention, we essentially eliminate this objectionable transient from the circuit of Fig. 3 by effectively shorting out the compensating capacitor $C_3$ at about the instant of current zero across the contacts of the breaker. This action, in effect, eliminates the voltage across the capacitor $C_3$ at about the same instant that the equal and opposite voltage across L is eliminated. The net change in the voltage $e_1$ is, therefore, zero, and the voltage $e_1$ remains the same immediately before and after interruption. As a result, the voltage $e_1$ would generally follow the dotted line sine curve shown in Fig. 2, thus closely simulating actual field conditions.

For shorting out the compensating capacitor $C_3$ at the desired instant, a gap device 20 is connected in shunt with the capacitor $C_3$ in the manner shown in Fig. 3. This gap device 20 is broken down by an impulse derived from a suitable impulse generator 22, which in turn is triggered by a suitable synchronizing device 24.

Figures 4, 9:
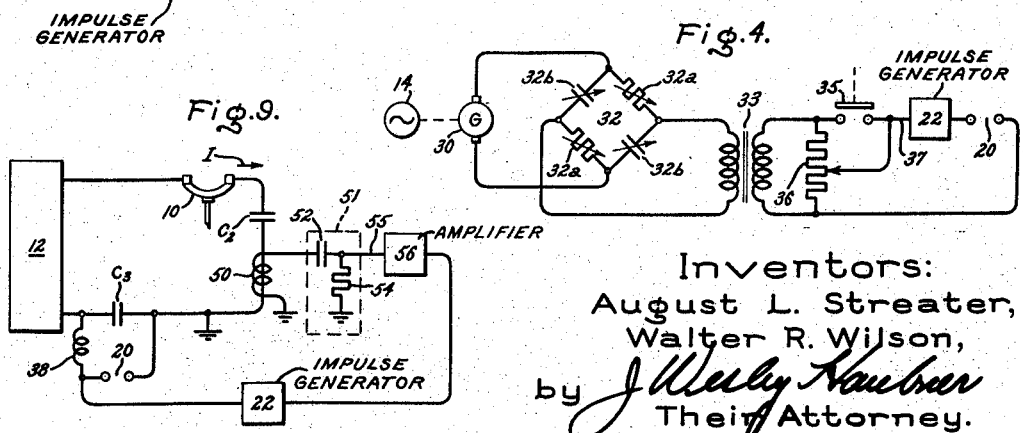
Fig. 4 illustrates a typical synchronizing device which is utilized as a component of the circuit of Fig. 3.
Fig. 9 shows a modified form of synchronizing device which can be used as a component of the test circuits of our invention.

Both the impulse generator 22 and the synchronizing device 24 can be of any suitable conventional form, and their details constitute no part of our invention. A schematic diagram of a suitable synchronizing device is shown in Fig. 4. Referring to Fig. 4, the synchronizing device shown therein comprises a pilot generator 30 which is driven from the main generator and which produces an output voltage in phase with the voltage of the main generator. This output voltage from the pilot generator 30 is applied to a phase-shifter of suitable form such as the bridge type phase-shifter schematically shown at 32 in Fig. 4. This phase-shifter 32 comprises one set of opposite arms, each of which is constituted by a variable resistor 32a, and another set of opposite arms, each of which is constituted by a variable condenser 32b. The junction point between one of the resistors and one of the condensers is connected to one output terminal of the pilot generator, and an opposed junction point is connected to the other output terminal of the pilot generator. A sinusoidal voltage appears across the other two terminals of the bridge-type phase-shifter, and the phase relation of this voltage to the output voltage of the pilot generator 30 can be regulated by suitably adjusting the impedances of the various arms of the phase-shifter.

This sinusoidal output voltage from the phase shifter 32 is transformed into pulses by means of a conventional peaking transformer 33 or any other suitable peak generator. These pulses from the peaking transformer 33 are applied to an input grid 37 of the impulse generator 22 but are normally of insufficient amplitude to fire the generator 22. If the pulses are sufficiently amplified, however, they are capable of firing the generator 22. This amplification is accomplished, for example, by closing a set of normally-open control contacts 35 which are connected in shunt with a portion of a resistor 36 connected across the output terminals of the peaking transformer 33. When these control contacts 35 are in open position, the voltage pulses supplied by peaking transformer 33 to the input grid 37 of the impulse generator 22 are of insufficient amplitude to fire the impulse generator. Closing of these control contacts 35, however, eliminates the voltage drop which had previously taken place across the now-shunted part of the resistor 36, and the next succeeding impulse applied to the input grid 37 is of sufficient amplitude to fire the impulse generator 22.

The control contacts 35 are operated from the circuit breaker 10 and are arranged to close at the instant that the main contacts of the breaker part. Thus, the first impulse from the peaking transformer 33 which occurs after the main contacts part fires the impulse generator 22. The phase-shifter 32 is so adjusted in relationship to the phase angle of the capacitive power circuit that this voltage impulse fires the impulse generator at an instant which causes the gap device 20 to break down at a natural current zero in the capacitive power circuit. The output of the synchronizing device 24 is coordinated with the main generator voltage rather than the current I. Thus, even if opening of the main circuit breaker 10 produces a "chopping" effect, i.e., forces the current I to zero before a natural zero, the synchronizing device will still cause the gap 20 to break down at a natural current zero. By so delaying this gap breakdown until natural current zero, instead of immediately initiating it, we have found that the transient in the voltage $e_1$, which is produced by chopping, is very appreciably reduced in amplitude. For example, in one typical test circuit, where chopping forces the current to zero 50 microseconds before natural current zero, a delay of 50 microseconds in sparking over the gap 20 has been found to reduce the amplitude of the transient to about ⅛ of the value which would be present if the gap were fired 50 microseconds ahead of current zero.

In connection with firing of the gap 20, it is noted that an isolating reactor 38 is connected in series with the gap and in shunt with the capacitor $C_3$. The purpose of this isolating reactor is to assure that essentially the full impulse voltage from the impulse generator 22 is applied to the gap 20 so as to assure its breakdown in response to the impulse. The capacitor $C_3$ presents negligible impedance to the steep wave-front impulse, and, accordingly, the isolating reactor is needed to provide impedance in what would otherwise amount to a short-circuit path insofar as the impulse is concerned. The reactor 38 presents negligible impedance to normal load frequency current and therefore is not specifically considered in the above discussion of the current and voltage relationships in the main power circuit.

Fig. 5 shows a slightly modified test circuit in which an additional capacitor $C_1$ is connected across the terminals of the source 12 in order to help smooth out any transient which might still occur in voltage $e_1$ upon opening of the circuit breaker 10. The capacitance of $C_1$ should be large in comparison to that of $C_0$, especially where $C_0$ is itself relatively large. By utilizing a capacitor $C_1$ which is large in comparison to $C_0$, it is possible to essentially avoid objectionable high frequency transients across $C_1$ caused by redistribution of charge between $C_0$ and $C_1$ upon breakdown of the gap 20. Such transients if allowed to develop could cause an undesirable change in the voltage $e_1$ and thus impair the severity of the test. Preferably, the capacitance of $C_1$ is on the order of ten times that of $C_0$.

If the capacitance of $C_1$ is appreciable in comparison to that of the load capacitor $C_2$, then the compensating capacitor $C_3$ should compensate only for the load capacitor $C_2$. In this regard, the steady-state voltage across the compensating capacitor $C_3$ should be equal and opposite to the voltage across L produced by only that current flowing into the load capacitor $C_2$. In other words, substantially the following relationship should be present:

$$I_2 X_L = (I_1 + I_2) X_{C3}$$

where:

$I_2$ = current flowing in the circuit of capacitor $C_2$
$I_1$ = current flowing in the circuit of capacitor $C_1$
$X_L$ = inductive reactance of the source
$X_{C3}$ = capacitive reactance of the capacitor $C_3$ From the above equation, it can be concluded that $X_{C3}$ should equal $$\frac{C_2}{C_1 + C_2} X_L$$

where:

$C_1$ is the capacitance of capacitor $C_1$
$C_2$ is the capacitance of capacitor $C_2$ Assuming that capacitor $C_3$ of Fig. 5 is selected so as to have the capacitive reactance set forth immediately above, then reference may be had to Fig. 6 for a vector diagram illustrating certain voltage relationships which would be present under steady-state conditions in the circuit of Fig. 5. In Fig. 6, $E_{L1}$ is the voltage across L due to that current in the circuit of capacitor $C_1$; $E_{L2}$ is the voltage across L due to that current in the circuit of capacitor $C_2$; and $E_{C3}$ is the total voltage across the compensating capacitor $C_3$.

Under steady-state conditions, the vector sum of $E_g$, $E_{L1}$, and $E_{L2}$ is equal to the vector sum of $e_1$ and $E_{C3}$. Immediately after interruption, $E_{L2}$ drops to zero, and the gap 20 sparks over to reduce $E_{C3}$ to zero, thus leaving the circuit in a new steady-state condition with $e_1$ unchanged. Since $e_1$ is essentially unchanged, the objectionable regulation transient is largely avoided and field conditions are accurately reproduced.

The compensating voltage which is provided by the series capacitor $C_3$ of Fig. 5 can also be provided by other suitable means. As an example, reference may be had to the modified test circuit of Fig. 7 wherein those components corresponding to like components in Fig. 5 have been given corresponding reference characters. In the circuit of Fig. 7, we obtain the compensating voltage by relying upon a second voltage source 40 connected in series with the first voltage source 12. This second source 40 comprises a generator 41 and a transformer 42 connected in circuit with the generator 41. The generator 41 is run in phase with the generator 14 of the first source, and its transformer 42 is connected into the power circuit in such a manner that it subtracts a voltage from the first transformer 16 substantially equal to the regulation voltage rise in the two sources caused by the load current $I_2$.

This second source 40 remains connected in the power circuit until the first natural current zero which occurs after opening of the circuit breaker 10. At this instant, the gap device 20 is sparked over by the impulse generator 22 in response to a signal received from the synchronizing device 24. This action effectively removes the second source 40 from the power circuit and thus compensates for the regulation voltage change in the same general manner as the circuit of Fig. 5.

Fig. 8 illustrates another modified test circuit embodying our invention. This circuit is similar in construction to the circuit of Fig. 5 except for certan features of the capacitor $C_3$ and its shunt circuit. More particularly, the capacitor $C_3$ of Fig. 8 is constructed of a large number of series-connected units, some of which $C_A$ are intended to compensate for the effect of load current $I_2$ flowing through L and the others of which $C_B$ are intended to compensate for the effect of the other current $I_1$ flowing through L. The gap device 20 is connected in shunt with only the capacitor units $C_A$. Thus, when the gap device 20 is caused to arc-over (in the same manner as in Fig. 5), it shorts out only the capacitor unit $C_A$, whereas the units $C_B$ always remain effectively connected in the power circuit.

In the circuit of Fig. 8, at normal source frequency, the inductive reactance of L is approximately equal to the sum of the capacitive reactances of $C_A$ and $C_B$. In addition, the ratio of the capacitance of $C_A$ to that of $C_B$ is approximately equal to the ratio of the capacitance of $C_1$ to that of $C_2$.

An advantage of this circuit of Fig. 8 is that the series capacitor $C_3$ compensates fully for the voltage across L on a long-time basis both before and after interruption. In this connection, when the circuit breaker 10 is closed, the capacitor units $C_A$ provide a voltage which is generally equal and vectorially-opposite to the voltage component produced by load current $I_2$ flowing through the inductance L, whereas the capacitor units $C_B$ provide a voltage which is generally equal and vectorially-opposite to the voltage component produced by the current $I_1$ flowing through the inductance L.

Referring particularly to the modification of Fig. 8, the gap 20 should preferably be of the self-clearing type, so that the spark across the gap is quickly extinguished and the capacitor $C_A$ quickly reinserted into the circuit. An example of a suitable self-clearing gap device is shown in U.S. Patent No. 2,391,758, issued to E. J. Wade et al. and assigned to the assignee of the present invention. A suitable high-resistance discharge resistor should also be connected across the capacitor $C_A$, as shown at 46, to remove any charges that might be trapped on the capacitor when the gap 20 clears.

The gap 20 in the other modifications (of Figs. 3, 5, and 7) need not be self-clearing, nor is a discharge resistor, such as 46, required in such modifications.

In the circuit of Fig. 5, where the capacitor $C_B$ of Fig. 8 is absent, the closed-circuit voltage across the terminals of the source 12 would tend to be uniformly high by an amount equal to the effective voltage across L caused by current flowing in the circuit of capacitor $C_1$. This is a relatively minor difference and can be compensated for by appropriately setting the open-circuit voltage of the source 12 slightly lower than the desired closed-circuit voltage.

An advantage of the circuit of Fig. 8 is that it eliminates the need for such a compensating setting in the voltage of the source 12. Another advantage of the circuit of Fig. 8 is that it permits the same bank of capacitors $C_3$ to be used for all values of load capacitance $C_2$. It is only necessary to change the top setting between $C_A$ and $C_B$ to give the desired ratio of $C_A$ to $C_B$.

While in the above description, the gap 20 has been sparked-over at the first natural current zero after the contacts of the circuit breaker 10 part, it is to be understood that in some cases it will be desirable to delay this action until the second natural current zero in order to simulate actual field conditions. This can be accomplished by suitably adjusting the controlling contacts 35 of the synchronizing device so as to provide for the desired delay.

Another synchronizing scheme for firing the impulse generator 22 is shown in Fig. 9. This scheme comprises an air core inductance 50 coupled to the circuit of capacitor $C_2$ and having a conventional differentiator circuit 51 connected across its terminals. This differentiator circuit 51 comprises a suitable capacitor 52 and a resistor 54 connected in series and having an output terminal 55 connected to the junction between the capacitor and the resistor. This circuit acts in a well known manner to provide an output voltage (between terminal 55 and ground) which varies directly in accordance with the frequency of the voltage across the terminals of the inductance 50. The output of the differentiator circuit 51 is supplied to an amplifier 56 which acts immediately to fire the impulse generator 22 when the output voltage from the differentiator circuit 51 is of sufficient amplitude.

Just before interruption by the breaker 10, the voltage induced in the inductance 50 is at a maximum since the rate at which current is changing in the circuit of capacitor $C_2$ is at a maximum. When interruption occurs, however, this induced voltage suddenly collapses, and a high frequency transient occurs across the terminals of inductance 50. This abruptly increases the voltage output of the differentiator circuit 51 and thus causes the amplifier 56 to fire the impulse generator 22. The impulse generator 22 breaks down the gap 20 in the same manner as described hereinabove, with such gap breakdown occurring substantially instantaneously after the current in the circuit of capacitor $C_2$ falls to zero.

The scheme of Fig. 9 is simpler than that of Fig. 4 but has the disadvantage that it is not readily adaptable to those conditions where the breaker 10 produces "chopping." In this regard, if opening of the breaker 10 drives the current I to zero before a natural current zero, then the gap 20 will be immediately fired instead of being desirably delayed until natural zero, as described in connection with the scheme of Fig. 4. If no appreciable chopping action is present, the scheme of Fig. 9 produces the same desirable results as that of Fig. 4. Even with "chopping" present, the scheme of Fig. 9 materially reduces the amplitude of the regulation voltage transient as compared to the transient which would occur in the circuit of Fig. 1.

While we have shown and described particular embodiments of our invention, it will be obvious to those skilled in the art that various changes and modifications may be made without departing from our invention in its broader aspects and we, therefore, intend in the appended claims to cover all such changes and modifications as fall within the true spirit and scope of our invention.

What we claim as new and desire to secure by Letters Patent of the United States is:

1. In a circuit for testing the capacitance-switching ability of a circuit breaker; a source of alternating voltage having a predetermined inductive reactance; first capacitor means connected in series with said source and having a capacitance which is representative of the capacitance which is to be switched under field conditions; a circuit breaker having contacts connected in series with said source and said first capacitor means and located electrically between said source and said first capacitor means; second capacitor means connected in series with said source, said contacts, and said first capacitor means; said second capacitor means having a capacitive reactance at the normal source frequency approximately equal to the inductive reactance of said source; and means responsive to opening of said contacts for establishing a shunt circuit about said second capacitor means within one cycle after said contacts part and during a current zero condition across said contacts; said shunt circuit being connected in series with said contacts, said source, and said first capacitor means.

2. The test circuit of claim 1 in which said shunt-circuit establishing means initially establishes said shunt circuit at about the instant of a natural current zero across said contacts.

3. In a circuit for testing the capacitance-switching ability of a circuit breaker; a source of alternating voltage having a predetermined inductive reactance; first capacitor means connected in series with said source and having a capacitance which is representative of the capacitance which is to be switched under field conditions, a circuit breaker having contacts connected in series with said source and said first capacitor means; second capacitor means connected in series with said source, said contacts, and said first capacitor means; said second capacitor means having a capacitive reactance at normal source frequency approximately equal to the inductive reactance of said source; a normally-open shunt circuit connected in parallel with said second capacitor means and in series with said source, said contacts, and said first capacitor means, and means operable upon opening of said circuit breaker and within one cycle after said contacts part for completing said shunt circuit at about the instant of a natural current zero across said contacts.

4. In a circuit for testing the capacitance-switching ability of a circuit breaker; a source of alternating voltage having a predetermined inductive reactance $X_L$; first capacitor means connected in series with said source and having a capacitance $C_2$ which is representative of the capacitance which is to be switched under field conditions; a circuit breaker having contacts connected in series with said source and said first capacitor means and located electrically between said source and said first capacitor means; a ballast capacitor connected in series with said source and in shunt with the series combination of said contacts and said first capacitor means, said ballast capacitor having a predetermined capacitance $C_1$; second capacitor means connected in series with said source, said contacts, said ballast capacitor and said first capacitor means; said second capacitor means having a capacitive reactance which approximately equals to $$\frac{C_2}{C_1+C_2}X_L$$

and means responsive to opening of said circuit breaker for establishing a shunt circuit around said second capacitor means within one cycle after said contacts part and at about the instant of a natural current zero across said contacts; said shunt circuit being connected in series with said contacts, said source, said first capacitor means, and said ballast capacitor.

5. In a circuit for testing the capacitance-switching ability of a circuit breaker; a source of alternating test voltage; capacitor means connected in series with said source and having a capacitance which is representative of the capacitance which is to be switched under field conditions; a circuit breaker having contacts connected in series with said source and said capacitor means for carrying when closed a predetermined load current between said source and said capacitor means; said test circuit having a predetermined inductance through which said load current flows; compensating means effectively connected in series with said source, said contacts, and said capacitor means; said compensating means acting while said contacts are closed to provide a voltage which is generally equal and vectorially opposite to the voltage component produced by load current flowing through said predetermined inductance; and means responsive to opening of said contacts for establishing a shunt circuit about said compensating means within one cycle after said contacts part and during a current zero condition across said contacts; said shunt circuit being connected in series with said contacts, and source, and said capacitor means.

6. The test circuit of claim 5 in which said shunt-circuit establishing means initially establishes said shunt circuit at about the instant of a natural current zero across said contacts.

7. In a circuit for testing the capacitance-switching ability of a circuit breaker; a source of alternating test voltage; first capacitor means connected in series with said source and having a capacitance which is representative of the capacitance which is to be switched under field conditions; a circuit breaker having contacts connected in series with said source and said first capacitor means for carrying when closed a predetermined load current between said source and said capacitor means; said test circuit having a predetermined inductance through which said load current flows; compensating-capacitor means effectively connected in series with said source, said contacts, and said first capacitor means; said compensating-capacitor means acting while said contacts are closed to provide a voltage which is generally equal and vectorially opposite to the voltage component produced by load curren flowing through said predetermined inductance; and means responsive to opening of said contacts for establishing a shunt circuit about said compensating-capacitor means within one cycle after said contacts part and at about the instant of a natural current zero across said contacts; said shunt circuit being connected in series with said contacts, said source, and said first capacitor means.

9. In a circuit for testing the capacitance-switching ability of a circuit breaker; a first source of alternating test voltage; capacitor means connected in series with said source and having a capacitance which is representative of the capacitance which is to be switched under field conditions; a circuit breaker having contacts connected in series with said source and said capacitor means for carrying when closed a predetermined load current between said source and said capacitor means; said test circuit having a predetermined inductance through which said load current flows; compensating means effectively connected in series with said source, said contacts, and said capacitor means; said compensating means comprising a second source of alternating voltage which supplies a compensating voltage in phase with and in voltage-subtracting relationship to the voltage of said first source; the voltage of said second source being generally equal and vectorially-opposite to the voltage component produced by load current flowing through the inductances of said two sources; and means responsive to opening of said contacts for establishing a shunt circuit about said compensating means within one cycle after said contacts part and at about the instant of a neutral current zero across said contacts; said shunt circuit being connected in series with said contacts, said source, and said capacitor means.

9. In a circuit for testing the capacitance-switching ability of a circuit breaker; a source of alternating test voltage; first capacitor means connected in series with said source and having a capacitance which is representative of the capacitance which is to be switched under field conditions; a circuit breaker having contacts connected in series with said source and said first capacitor means for carrying when closed a predetermined load current between said source and said capacitor means; said test circuit having a predetermined inductance through which said load current flows; the series combination of first and second compensating-capacitor means effectively connected in series with said source, said contacts, and said first capacitor means; said first compensating-capacitor means acting while said contacts are closed to provide a voltage which is generally equal and vectorially opposite to the voltage component produced by load current flowing through said predetermined inductance; said second compensating-capacitor means acting while said contacts are closed to provide a voltage which is generally equal and vectorially opposite to the voltage component produced by any circuit current other than load current flowing through said predetermined inductance, and means responsive to opening of said contacts for establishing a shunt circuit about said first compensating-capacitor means within one cycle after said contacts part and at about the instant of a natural current zero across said contacts; said shunt circuit being connected in series with said contacts, said source, said first capacitor means, and said second compensating-capacitor means.

10. In a circuit for testing the capacitance-switching ability of a circuit breaker; a source of alternating voltage; first capacitor means connected in series with said source and having a capacitance which is representative of the capacitance which is to be switched under field conditions; a circuit breaker having contacts connected in series with said source and said first capacitor means for carrying when closed a predetermined load current between said source and said first capacitor means; said test circuit having a predetermined inductance through which said load current flows; a ballast capacitor connected in series with said source and in shunt with the series combination of said contacts and said first capacitor means, compensating means effectively connected in series with said source, said contacts, said ballast capacitor, and said first capacitor means; said compensating means acting while said contacts are closed to provide a voltage which is generally equal and vectorially opposite to the voltage component produced by load current flowing through said predetermined inductance, and means responsive to opening of said contacts for establishing a shunt circuit about said compensating means within one cycle after said contacts part and at about the instant of a natural current zero across said contacts; said shunt circuit being connected in series with said contacts, said source, said first capacitor means, and said ballast capacitor.

11. In the test circuit of claim 5, a ballast capacitor connected in series with said source and in shunt with the series combination of said contacts and said first capacitor means.

12. A method of utilizing a low-capacity alternating power source for evaluating the ability of a circuit breaker to isolate a capacitive load from a high-capacity alternating power source, comprising: connecting said circuit breaker in a test circuit with its contacts located electrically between said low-capacity source and capacitor means having a capacitance representative of the capacitance of said load; energizing said low-capacity source and causing load current to flow between said source and said capacitor means via said contacts; developing in series with said source, said contacts, and said capacitor means a compensating voltage which is generally equal and vectorially opposite to the voltage component produced by load current flowing through the inductance of said test circuit; separating said contacts; and then abruptly reducing said compensating voltage to substantially zero within one cycle after said contacts part and during a zero current condition across said contacts.

13. The method of claim 12 in which said compensating voltage is abruptly reduced to substantially zero at about the instant of a natural current zero across said contacts.

References Cited in the file of this patent

FOREIGN PATENTS 662,549   Great Britain _____ Dec. 5, 1951